United States Patent [19]
Jacoby

[11] Patent Number: 5,774,926
[45] Date of Patent: Jul. 7, 1998

[54] GRADUATED WINDSHIELD WIPER CLEANING ELEMENTS

[76] Inventor: John J. Jacoby, 1919 Paper Mill Rd., Huntington Valley, Pa. 19006

[21] Appl. No.: 661,297

[22] Filed: Jun. 13, 1996

[51] Int. Cl.$^6$ .................................. B60S 1/56; B05D 5/02
[52] U.S. Cl. .................................. 15/250.001; 15/250.19; 15/246; 296/54.1; 29/897.2; 101/35; 427/287
[58] Field of Search .................. 15/250.001, 250.19, 15/246, 250.16; 296/96.16, 84.1; 29/897.2; 101/35; 427/445, 287, 407.2

[56] References Cited

U.S. PATENT DOCUMENTS

| | | | |
|---|---|---|---|
| 2,974,340 | 3/1961 | Kopczynski | 15/250.001 |
| 3,908,222 | 9/1975 | Scott | 15/250.001 |
| 4,934,013 | 6/1990 | Jacoby | 15/250 R |
| 5,007,130 | 4/1991 | Jacoby | 15/250 R |
| 5,226,199 | 7/1993 | Jacoby | 15/250.001 |
| 5,513,412 | 5/1996 | Longazel | 15/250.001 |
| 5,634,233 | 6/1997 | Pettersson | 15/250.001 |

*Primary Examiner*—Gary K. Graham

[57] ABSTRACT

A field of windshield wiper cleaning elements (10) is arranged above each wiper's resting position on a windshield (16). It includes several horizontal rows of slightly raised round dots or squares (11–15, 21–25) applied to the exterior surface of the windshield. The cleaning elements graduate from a maximum size along the bottom edge of the field, to a minimum size along the top edge of the field. The wipers scrape across the cleaning elements whenever they are operated, so that they are cleaned automatically. Cleaning effectiveness is improved by the graduated sizes of the cleaning elements. They are made by applying a ceramic ink on the windshield and firing the windshield, so that they are extremely durable.

20 Claims, 1 Drawing Sheet

GRADUATED WINDSHIELD WIPER CLEANING ELEMENTS

BACKGROUND OF THE INVENTION

1. Field of the Invention

This invention relates generally to automobile windshields, specifically to an arrangement of wiper cleaning elements applied on a windshield.

2. Prior Art

Windshield wipers lose their effectiveness when they become dirty, so that they leave water streaks across the windshield that reduce visibility. Their effectiveness can be maintained if they are cleaned regularly. However, most drivers do not clean their wipers regularly. The same problem (water streaks) occurs with new wipers, which are stiff or non-flexible until they are broken-in.

Several of my patents disclose windshield wiper cleaners that automatically clean a wiper during its normal operation. My U.S. Pat. No. 4,934,013 (1990) discloses elongated, raised cleaning elements arranged along the bottom of the windshield, above the wipers' resting position. My U.S. Pat. Nos. 5,007,130 (1991) and 5,226,199 disclose round cleaning elements or dots. The cleaning elements are adhesively applied, or manufactured as an integral part of the windshield. When the wipers are operated, they scrape against the cleaning elements, which remove adherents and dirt by abrasion. The wipers are thus automatically cleaned whenever they are used. However, I have noted that the cleaning ability of such prior art cleaning elements, although very effective, is not maximized. E.g., water sometimes streaks across the windshield, especially with new wipers, and occasionally foreign matter adheres to the windshield, even after the wipers have passed over the dots.

OBJECTS OF THE INVENTION

Accordingly the primary objects of the present invention are to provide windshield wiper cleaning elements which automatically clean the wipers whenever they are operated to maintain their performance, and which clean the wipers more effectively than prior art cleaning elements. Additional objects are to provide windshield wiper cleaning elements which are made of a very durable material, and which are manufactured as an integral part of a windshield for even greater durability. Further objects of the present invention will become apparent from a consideration of the drawings and ensuing description.

SUMMARY OF THE INVENTION

A field of windshield wiper cleaning elements is arranged above each wiper's resting position on a windshield. It includes several horizontal rows of slightly raised round dots or squares applied to the exterior surface of the windshield. The cleaning elements are graduated in size between the top and bottom rows, so that the largest elements are on the bottom row, and the smallest elements are on the top row. The wipers scrape across the cleaning elements whenever they are operated, so that they are cleaned automatically. Cleaning effectiveness is improved by the graduated sizes of the cleaning elements. They are made of a durable material, and are manufactured as an integral part of the windshield.

DRAWING REFERENCE NUMERALS

| | |
|---|---|
| 10. Field Of Wiper Cleaning Elements | 11–15. Wiper Cleaning Elements |
| 16. Windshield | 17. Wipers |
| 20. Field Of Wiper Cleaning Elements | 21–25. Wiper Cleaning Elements |

DESCRIPTION—FIGS. 1 AND 2—FIRST EMBODIMENT

Figure 1:
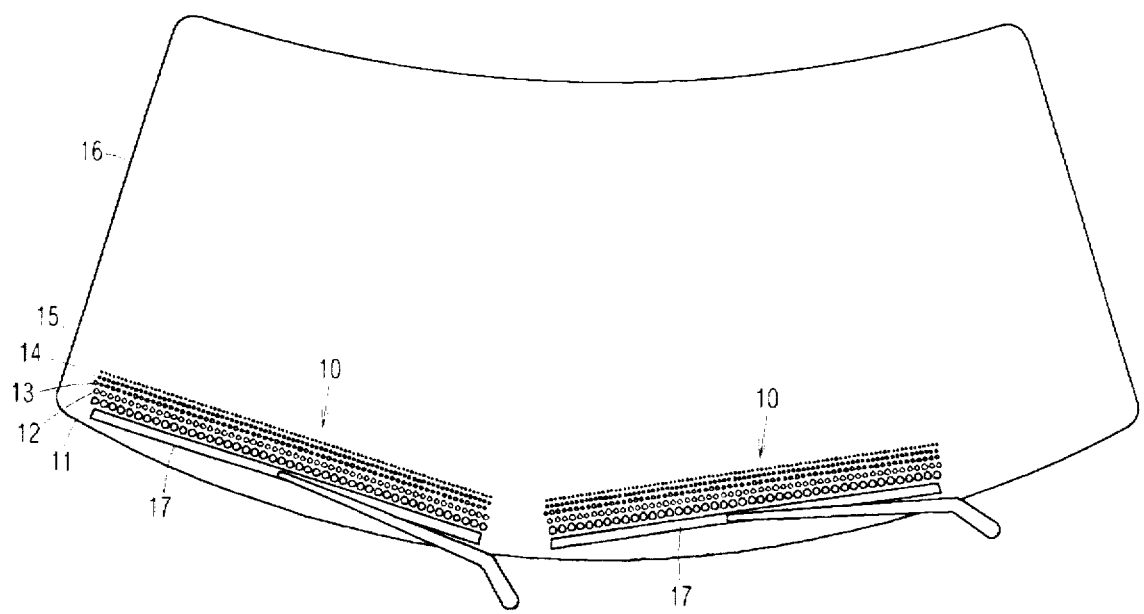
FIG. 1 is a front view of an arrangement of windshield wiper cleaning elements on a windshield in accordance with a first embodiment of the invention.
Figure 2:
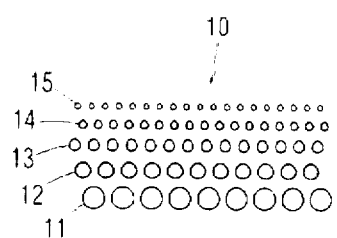
FIG. 2 is an enlarged view of the windshield wiper cleaning elements of FIG. 1.

In accordance with a first embodiment of the invention shown in the front view of FIG. 1, several parallel rows of raised, circular windshield wiper cleaning elements 11–15 are arranged in a rectangular field 10 on the exterior surface of a windshield 16, immediately above the resting position of each wiper 17. Each field 10 is parallel to and about as long as the corresponding wiper 17. Each row includes identically shaped cleaning elements. They are graduated in size from top to bottom, so that cleaning elements 15 on the top row are the smallest, and cleaning elements 11 on the bottom row are the largest. They are closely arranged along each row. Preferably, they graduate from a minimum width or diameter of about 0.5 mm at the top row, to a maximum width or diameter of about 3 mm at the bottom row. Cleaning elements 11–15 are shown enlarged in FIG. 2 for clarity and illustration of their pitch or separation.

The cleaning elements are applied as a ceramic ink and baked onto the exterior surface of windshield 16 during its manufacturing process. The ink is composed of:

1. Lead-free frit (a vitreous, fused substance of zinc borate, bismuth, or zinc/bismuth), 60–85% by weight of the solids in the ink.
2. Copper chrome spinel (mineral with composition $MgAl_2O_4$) colorants, 15–40% by weight of the solids in the ink.
3. A liquid organic medium which is either ultraviolet or infrared curable.

The ink preferably has a linear thermal expansion coefficient within the range of $70-105 \times 10^7/°$ C. Preferably, the ink is viscous enough to produce cleaning elements about 0.013–0.077 mm thick after firing. The viscosity of the ink is controlled by the ratio of the solids to the organic medium. Not more than 0.1% by weight of the solids in the ink should have a dimension greater than 44 microns, and no more than 22% by weight of the solids in the ink should have a dimension greater than 10 microns.

The frit preferably is a blend of "high firing" (1200° F.) and "low firing" (1050° F.) frit, so as to achieve a mixture with a desired firing temperature, such as 1125° F.

All inks used preferably have a similar organic medium, so that they can be blended without detrimental effects on shelf-life, printing properties, or fired appearance. The medium may be a mixture of ethyl cellulose, terpineol, non-ionic surfactants, and fatty acids.

The ink should be thoroughly mixed with a planetary mixer, and rolled at least three times with a temperature-controlled, three-roll mill at room temperature. After mixing and rolling, a Brookfield viscometer set at 10 rpm, using a #4 spindle, should be used to determine the ink's viscosity, and generate a viscosity curve as a function of temperature for quality assurance. The blended ink should be stored under ambient conditions for three months, and its viscosity checked weekly for stability.

Windshield 16 should be cut to the desired size and shape. Its edges should be ground or seamed to a desired radius, checked for tin orientation, and washed. The washing ensures a clean surface, and also assures the desired temperature during cleaning element printing. If windshield 16 is too hot, it will cause a volatile organic loss, which will increase the viscosity of the ink and result in poor lay-down. If windshield 16 is too cold, the viscosity of the ink will increase as the ink cools, and result in a poor print.

Windshield 16 is aligned under a screen printer for printing. The dive, off-contact, flood speed, and squeegee speed are determined by the operator. (Dive is the distance the squeegee travels in a vertical direction when air pressure is applied to the rolling cylinders. Off-contact distance is the distance from the substrate side of the screen to the top of the glass.) The squeegee is preferably made of 70 durameter rubber. A screen printer with peel should be used, which will maintain the off-contact distance, screen tension (nominal 20 Newtons), dive, and other printing parameters. The screening material should be placed at a 15° to 25° angle with respect to either a stretch-and-glue or Newman roller screen frame, which will eliminate jagged edges in the printed elements.

The printed thickness of the cleaning elements is controlled either by the capillary film or emulsion thickness that is placed onto the nylon screen. The desired image, or fade-out, is achieved by using a ruby, or by using digital data with a computer aided drafting program. (A ruby is a piece of colored Mylar™ film which is used to mask ultra-violet actinic radiation used to form the substrate emulsion.)

The minimum size of a printed element is two mesh openings and two mesh threads on the screen. In practice, the minimum size was found to be 0.5 mm. Smaller element sizes can be achieved by using a variable screen produced by Schweiz Seidengazefabrik AG of Thal, Switzerland. The variable screen can be used to produce cleaning elements of any size, from large to very small, and all the way to solid fields. The thickness of the printed elements can be checked by either a roller or comb gauge. Final fired film thickness should be measured by a Tencor profilometer or an optical microscope.

The final step may be either one of the following:

1. Press Bending—Either "Outside" or "Inside" The Furnace

If a very high firing temperature frit was used in the ink, windshield 16 can be fired in the bending furnace as a flat piece. The fired windshield 16 is then flipped over, and conventional printing operations can be performed on its number two surface. (A conventional windshield is made by sandwiching a polyvinyl butyral sheeting between two panes of glass. The exterior surface of the outer pane is exposed to the environment to provide the number one surface. The surface of the outer pane which touches the polyvinyl butyral sheeting provides the number two surface. The surface of the inner pane which touches the polyvinyl butyral sheeting provides the number three surface. Finally, the interior surface of the inner pane provides the number four surface). When windshield 16 goes through the furnace for the second time, the ink on the number two surface is fired to maturity, and windshield 16 is bent into a desired shape. The conventional ink printed on the number two surface must have a much lower melting point than the ink printed on the number one surface. If the inks have melting temperatures that are too close, the ceramic ink on the exterior or number one surface could reduce in viscosity so much that it could fuse to the rollers of the furnace.

2. Gravity or Gravity Assist Bending

After the cleaning elements are printed and cured, the dried ink must pass a "thumb test", which is performed by pressing and twisting a thumb on the cleaning elements to see if any ink comes off. If ink is removed, higher temperature settings of the drier are required. If a hotter drier does not produce a durable print, then more resins and binders must be added to the organic medium of the ink. Printed and dried windshields 16 are flipped over and the process repeated using conventional ink on the number two surface. Windshield 16 is then placed into a glass bending mold and shaped.

The particular ink used and the firing process result in wiper cleaning elements which are extremely durable. They will resist scraping by wipers 17, scraping by ice scrapers, and impact by minor flying debris.

DESCRIPTION —FIG. 3—SECOND EMBODIMENT

Figure 3:
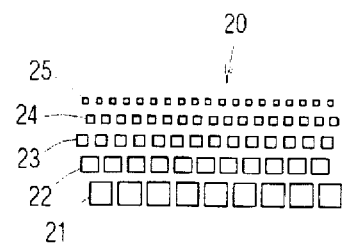
FIG. 3 is an arrangement of windshield wiper cleaning elements in accordance with a second embodiment of the invention.

In accordance with a second embodiment of the invention shown in FIG. 3, several parallel rows of rectangular windshield wiper cleaning elements 21-25 are arranged in a rectangular field 20.

OPERATION—FIGS 1 TO 3

With the cleaning dots in place on a windshield as shown in FIG. 1, each windshield wiper blade will pass over its field of dots twice per cycle. The dots will scrape any debris, including dirt, bugs, dust, film, etc. off both sides of the blade. I.e., on its down stroke, the blade will be tilted so that its lower surface is dragged over the dots, which scrape the lower surface clean. Then on its up stroke, the blade will be tilted in the opposite direction so that its upper surface is dragged over the dots, which scrape the upper surface clean. The debris will be caught on the dots where it will be either washed away by the rain or removed when the windshield is cleaned in the usual manner, e.g., with a rag. The dots will excite more effective turbulent cleaning because their increasing fine texture in the vertical direction prevents water streaks on the windshield, as was caused by the larger dots of prior-art devices.

Also, variably sized dots effectively remove more kinds of adhering foreign matter that the wiper blades have removed from the windshield. The progressive sizes of the dots further stimulates the combined actions of scraping, scrubbing, and rubbing, while using the pressure of the wiper blade against the windshield to force the water trapped between the dots to backwash the wiper and drain through the spaces between the dots. As a result, better visibility and greater safety are provided.

In addition to being attractive, useful, and cost effective, the wiper cleaning elements will withstand ice scrapers and minor impacts, and should never need replacement for the life of the windshield.

SUMMARY, RAMIFICATIONS AND SCOPE

Accordingly, the reader will see that I have provided windshield wiper cleaning elements which automatically clean the wipers whenever they are operated, so as to maintain their performance. They clean the wipers more effectively than prior art cleaning elements, including preventing water streaks, even with new wiper blades. They are also extremely durable.

Although the above descriptions are specific, they should not be considered as limitations on the scope of the invention, but only as examples of the embodiments. Many other ramifications and variations are possible within the teachings of the invention. For example, the cleaning elements can be of any other shape, such as oval, rectangular, triangular, pentagonal, hexagonal, etc., as well as irregular. They may have different thicknesses, and may be of different widths, as long as they are graduated in size between the top and bottom rows. More or fewer rows of cleaning elements may be used. The size graduation may be reversed, i.e., the largest elements may be arranged along the top row, and the smallest elements may be arranged along the bottom row. In addition to being graduated in width, the elements can also be graduated in thickness, with the top row being the thinnest, and the bottom row being the thickest, or vice versa. Other types of inks or manufacturing processes may be used. The effectiveness of the dots in cleaning the wipers of foreign matter can be adjusted empirically by varying their diameters, height, number, and spacing. The cleaning elements may be applied to a windshield with a die-cut adhesive strip, as disclosed in my U.S. Pat. No. 5,226,199. Therefore, the reader is requested to determine the scope of the invention by the appended claims and their legal equivalents, and not by the examples given.

I claim:

1. In a windshield wiper system of a vehicle having a windshield and a windshield wiper, a wiper cleaner comprising:

a plurality of raised cleaning elements arranged in an elongated field defining a plurality of rows, said field being arranged on an exterior surface of said windshield above and parallel to a resting position of said wiper, said field having a top edge and a bottom edge, said cleaning elements having a predetermined range of widths, said cleaning elements being graduated in width, between rows, between said top edge and said bottom edge of said field, so that whenever said wiper is operated, said wiper is cleaned by scraping across said cleaning elements.

2. The windshield wiper cleaner of claim 1 wherein said cleaning elements along said top edge of said field are of a minimum size, and said cleaning elements along said bottom edge of said field are of a maximum size, said cleaning elements gradually reducing in size from said bottom edge to said top edge of said field.

3. The windshield wiper cleaner of claim 1 wherein said cleaning elements are arranged in a plurality of parallel rows.

4. The windshield wiper cleaner of claim 3 wherein said cleaning elements along a top row are of a minimum size, and said cleaning elements along a bottom row are of a maximum size, said cleaning elements gradually reducing in size from said bottom row to said top row.

5. The windshield wiper cleaner of claim 1 wherein said cleaning elements are round.

6. The windshield wiper cleaner of claim 1 wherein said cleaning elements are rectangular.

7. The windshield wiper cleaner of claim 1 wherein said cleaning elements graduate from a maximum width of about 3 mm to a minimum width of about 0.5 mm.

8. The windshield wiper cleaner of claim 1 wherein said cleaning elements are about 0.013 mm to 0.077 mm thick.

9. The windshield wiper cleaner of claim 1 wherein said cleaning elements are composed of lead-free frit, copper chrome spinel colorants, and an organic medium.

10. A windshield wiper cleaner, comprising:

windshield; and a plurality of raised cleaning elements arranged in an elongated field, defining a plurality of rows, on an exterior surface of said windshield, said field being arranged above and parallel to a resting position of a windshield wiper, said field having a top edge and a bottom edge, said cleaning elements having a predetermined range of widths, said cleaning elements being graduated in width, between rows, between said top edge and said bottom edge of said field, so that whenever said wiper is operated, said wiper is cleaned by scraping across said cleaning elements.

11. The windshield wiper cleaner of claim 10 wherein said cleaning elements along said top edge of said field are of a minimum size, and said cleaning elements along said bottom edge of said field are of a maximum size, said cleaning elements gradually reducing in size from said bottom edge to said top edge of said field.

12. The windshield wiper cleaner of claim 10 wherein said cleaning elements are arranged in a plurality of parallel rows.

13. The windshield wiper cleaner of claim 12 wherein said cleaning elements along a top row are of a minimum size, and said cleaning elements along a bottom row are of a maximum size, said cleaning elements gradually reducing in size from said bottom row to said top row.

14. The windshield wiper cleaner of claim 10 wherein said cleaning elements are round.

15. The windshield wiper cleaner of claim 10 wherein said cleaning elements are rectangular.

16. The windshield wiper cleaner of claim 10 wherein said cleaning elements graduate from a maximum width of about 3 mm to a minimum width of about 0.5 mm.

17. The windshield wiper cleaner of claim 10 wherein said cleaning elements are about 0.013 mm to 0.077 mm thick.

18. The windshield wiper cleaner of claim 10 wherein said cleaning elements are composed of lead-free frit, copper chrome spinel colorants, and an organic medium.

19. A method for applying a plurality of windshield wiper cleaning elements on a windshield, comprising the steps of:

providing a ceramic ink composed of lead-free frit, copper chrome spinel colorants, and an organic medium;

providing said windshield;

printing said windshield wiper cleaning elements in said ceramic ink in a field, defining a plurality of rows, on an exterior surface of said windshield, said field being adapted to be arranged above and parallel to a resting position of a windshield wiper, said field having a top edge and a bottom edge, said cleaning elements having a predetermined range of widths, said cleaning elements being graduated in width, between rows, between said top edge and said bottom edge of said field; and curing said ink on said windshield.

20. The windshield wiper cleaner of claim 19 wherein said cleaning elements along said top edge of said field are of a minimum size, and said cleaning elements along said bottom edge of said field are of a maximum size, said cleaning elements gradually reducing in size from said bottom edge to said top edge of said field.

* * * * *